Sept. 4, 1956     C. B. HARROP     2,761,368
CULTIVATOR CLAMP
Filed Nov. 13, 1953

INVENTOR
CLIFFORD B. HARROP

Paul O. Pippel
ATTORNEY

United States Patent Office 2,761,368
Patented Sept. 4, 1956

2,761,368

CULTIVATOR CLAMP

Clifford B. Harrop, Ancaster, Ontario, Canada, assignor to International Harvester Company, a corporation of New Jersey Application November 13, 1953, Serial No. 392,026

5 Claims. (Cl. 97—47.84)

This invention relates to agricultural implements and particularly to tillage tools. The invention particularly concerns tillage tools of the vibrating type and is specific to improved means for securing such tools to a support. The invention is described in its application to an implement of the field plow or cultivator type wherein an elongated wheeled frame extending transversely of the direction of travel carries a plurality of laterally spaced earth-working tools and is propelled over the ground by a tractor or the like.

An object of the invention is the provision of an improved mounting for an earth-working tool upon a supporting frame.

Another object of the invention is the provision, in an implement of the field cultivator type, of improved means for securing the earth-working tool to the supporting frame to accommodate vibration of the tool during operation to effectively agitate and till the soil penetrated thereby.

Another object of the invention is to provide an improved clamp for securing a vibratory tool shank to a transverse tool-supporting bar.

Other objects and advantages of the invention will become clear from the following detailed description when read in conjunction with the accompanying drawings, wherein.

Figure 1:
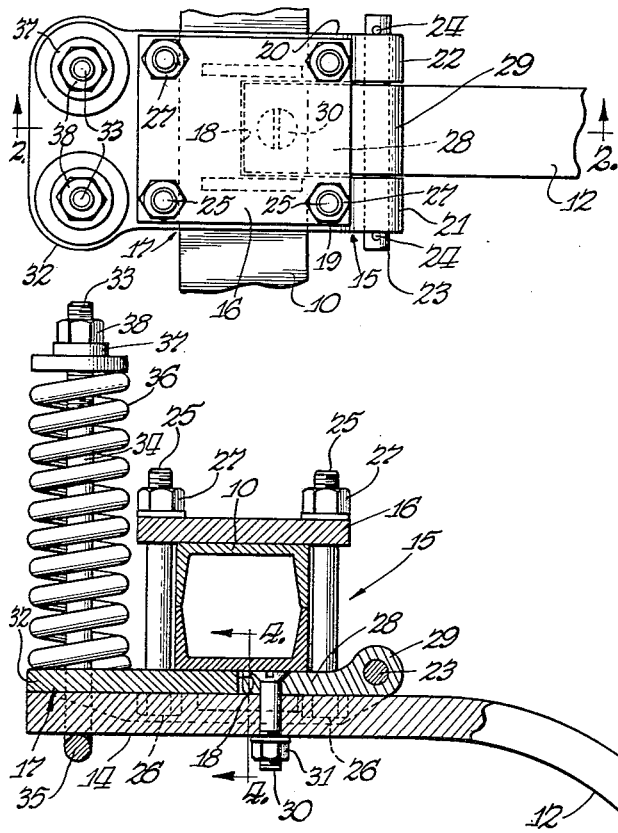
Figure 1 is a plan view of a portion of a tool-supporting frame and a clamping structure incorporating the features of this invention mounted thereon.
Figures 2, 3:
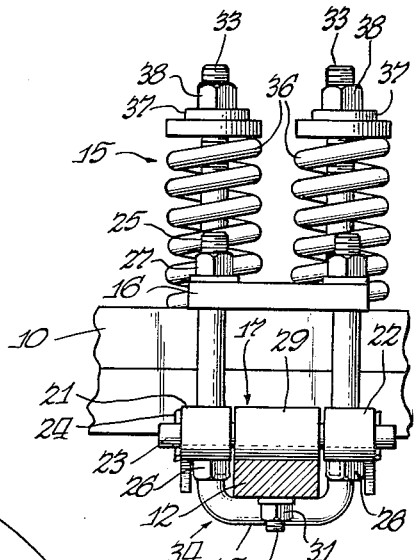
Figure 2 is a section on the line 2—2 of Figure 1.
Figure 3 is a rear elevation of the structure shown in Figure 1.
Figure 4:
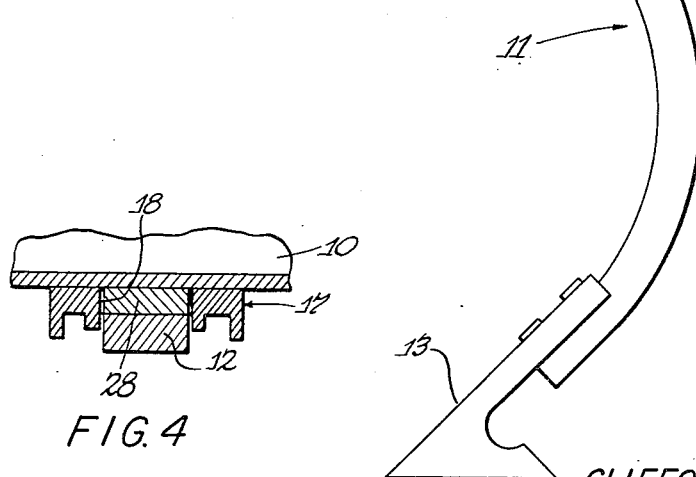
Figure 4 is a section taken on the line 4—4 of Figure 2.

With reference to the drawings, the numeral 10 designates a portion of the frame of an implement of the field cultivator type in the form of a tubular tool-supporting bar, square in section. It may be understood that the tool bar 10 extends transversely of the implement frame and has mounted thereon a plurality of earth-working units 11, each of which comprises a tool shank 12 and an earth-penetrating tool 13.

The tool shank 12 has a longitudinally extending horizontal portion 14 and curves downwardly and forwardly at its rear end, supporting at its lower end the tool 13. The tool shank 12 is secured to the transverse bar 10 by clamping mechanism 15 which comprises an upper plate-like element 16 engaging the upper face of the bar 10 and a lower element 17, which engages the bottom of the bar 10 and the upper face of the horizontal portion 14 of the tool shank 12.

As indicated in Figure 1, the lower clamping element 17 has a cutout portion or slotted opening 18 forming rearwardly extending laterally spaced arms 19 and 20 enlarged at their ends to form bosses 21 and 22, respectively, having transversely aligned bores therethrough adapted to receive a hinge or pivot pin 23. Pivot pin 23 is retained against displacement by the provision of cotters 24.

The upper plate 16 of the clamp and lower plate 17 are apertured to receive laterally and longitudinally spaced pairs of bolts 25 having heads 26 thereon and threaded at their upper ends to receive nuts 27 engageable with the upper face of the clamping element 16. These bolts are laterally spaced sufficiently to receive therebetween the horizontal portion 14 of the shank 12 which engages the lower face of the clamping element 17.

Associated with the lower clamping element 17 is a rockable member in the form of a tongue 28 occupying the cutout portion 18 between the arms 19 and 20 and having an enlarged or boss portion 29 transversely bored for mounting upon the pin 23 for rocking movement thereon in a vertical plane about the axis of the pin 23. The tongue 28 is secured to the horizontal portion 14 of the tool shank by means of a conically headed bolt 30 receivable in a countersunk opening in the tongue 28 and a registering opening in the shank 12. A nut 31 secures the tongue to the shank. The tool shank 12 is thus pivotable in a vertical plane about an axis represented by the pivot pin 23. The plate 17 extends forwardly beyond the forward end of the plate 16 and terminates in a broadened portion 32 having laterally spaced apertures therein to slidably receive the vertically extending laterally spaced arms 33 of a U-bolt 34, the transverse bight portion 35 of which engages and straddles the lower face of the forward end of the tool shank 12. A pair of springs 36 surround the respective arms 33 of the U-bolt, engaging at their lower ends the upper face of the extension 32 of the lower clamping element 17, and at their upper ends engaging a collar 37 provided on each of the arms 33 and held under compression by nuts 38 on the threaded upper ends of the arms, whereby the compression on the springs may be adjusted, as desired.

Pivoting of the tool shank 12 about the axis of the pin 23 is resisted by the springs 36 which tend to hold the horizontal portion of the tool shank against the lower face of the element 17. The amount of resistance offered is determined by the compression upon the springs 36. In operation, rapid vibration of the tool shank 12 and the element 13 occurs, resulting from the soil resistance encountered by the earth-working tools against the compression of the springs 36 and accommodated by the pivoting of the shank with the tongue 28. The tool shank is thus secured to the tool bar 10 by clamping means which accommodates but yieldably resists rocking of the tool shank relative to the tool bar.

The operation of the improved clamping means of this invention should be clearly understood from the foregoing description. It should likewise be understood that modifications may be made in the invention without departing from the spirit thereof or the scope of the appended claims.

What is claimed is:

1. In an agricultural implement including a transverse frame bar and an earth-working tool carried thereby, said tool having a rear earth-penetrating portion and a forwardly extending horizontal shank portion, clamping means for flexibly mounting the tool on the frame bar comprising an upper element engageable with the upper surface of the bar, a plate engaging the lower surface of the bar and the upper surface of the shank, including a main body having a cutout portion forming spaced rearwardly extending arms and secured to the upper element, a pivot pin extending between and mounted in said arms, a tongue member fitted in said cutout portion having its upper and lower surfaces in the plane of the respective upper and lower surfaces of said main body and rockably mounted on said pin, means for securing the shank to the tongue member for rocking therewith about the axis of the pivot pin relative to the main body, and resilient means yieldably connecting the forward end of the shank to the plate to resist said rocking of the shank.

2. In an agricultural implement including a transverse frame bar and an earth-working tool carried thereby, said tool having a rear earth-penetrating portion and a forwardly extending horizontal shank portion, clamping means for flexibly mounting the tool on the frame bar comprising an upper element engageable with the upper surface of the bar, a plate engaging the lower surface of the bar and the upper surface of the shank, including a main body having a cutout portion forming spaced rearwardly extending arms and secured to the upper element, a pivot pin extending between and mounted in said arms, a tongue member fitted in said cutout portion having its upper and lower surfaces in the plane of the respective upper and lower surfaces of said main body and rockably mounted on said pin, means for securing the shank to the tongue member for rocking therewith about the axis of the pivot pin relative to the main body, resilient means yieldably connecting the forward end of the shank to the plate to resist said rocking of the shank, said resilient means comprising a U-bolt having its legs straddling the shank and extending upwardly through openings provided in the plate, and a coil spring surrounding each bolt leg and operatively engageable with the plate and the bolt.

3. In an agricultural implement including a transverse frame bar and an earth-working tool carried thereby, said tool having a rear earth-penetrating portion and a forwardly extending horizontal shank portion, clamping means for flexibly mounting the tool on the frame bar comprising an upper element engageable with the upper surface of the bar, a plate engaging the lower surface of the bar and the upper surface of the shank, said plate projecting forwardly and rearwardly beyond said frame bar and secured to the upper element, the rear edge of the plate being enlarged and having a transverse bore, a pivot pin seated in said bore, means for securing said shank to the plate for pivoting thereof about the axis of said pin comprising a tongue member, said plate having a portion cut out to form a recess to receive said tongue, said tongue having a bearing portion to receive said pin to accommodate pivoting of the tongue in a vertical plane and said tongue having its upper and lower surfaces in alignment with the respective upper and lower surfaces of said plate, means for securing the tongue to said shank for pivoting therewith, and a yieldable connection between the forward end of the plate and the tool shank.

4. The invention set forth in claim 3, wherein the means for securing the tongue to the shank is a bolt extending through registering openings in the shank and the forward end of the tongue.

5. The invention set forth in claim 4, wherein said bolt serves to prevent longitudinal displacement of the shank relative to the frame bar, and wherein said yieldable connection is a U-shaped bolt straddling the forward end of the shank, having its legs extending through openings provided in the forwardly projecting portion of the plate and surrounded by springs operative to resist movement of the shank away from the plate.

References Cited in the file of this patent

UNITED STATES PATENTS

| 2,627,798 | Graham | Feb. 10, 1953 |
| 2,674,172 | Graham | Apr. 6, 1954 |

FOREIGN PATENTS

| 197,989 | Great Britain | May 11, 1923 |
| 466,085 | Canada | June 27, 1950 |